US012713099B2

(12) United States Patent
Kim et al.

(10) Patent No.: US 12,713,099 B2
(45) Date of Patent: Aug. 18, 2026

(54) DISPLAY DEVICE AND METHOD FOR OPERATING SAME

(71) Applicant: LG ELECTRONICS INC., Seoul (KR)

(72) Inventors: Taeeun Kim, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 18/713,076

(22) PCT Filed: Nov. 25, 2021

(86) PCT No.: PCT/KR2021/017467
§ 371 (c)(1),
(2) Date: May 23, 2024

(87) PCT Pub. No.: WO2023/095947
PCT Pub. Date: Jun. 1, 2023

(65) Prior Publication Data

US 2025/0024110 A1 Jan. 16, 2025

(51) Int. Cl.

| | |
|---|---|
| ***H04N 21/4788*** | (2011.01) |
| ***G10L 15/08*** | (2006.01) |
| ***G10L 15/22*** | (2006.01) |
| ***G10L 15/30*** | (2013.01) |
| ***H04N 7/15*** | (2006.01) |
| ***H04N 21/422*** | (2011.01) |

(52) U.S. Cl.
CPC ......... *H04N 21/4788* (2013.01); *G10L 15/08* (2013.01); *G10L 15/22* (2013.01); *G10L 15/30* (2013.01); *H04N 21/42203* (2013.01); *H04N 21/42222* (2013.01); *G10L 2015/088* (2013.01); *H04N 7/15* (2013.01)

(58) Field of Classification Search
CPC ..................... H04N 21/4788; H04N 21/42222
See application file for complete search history.

(56) References Cited

U.S. PATENT DOCUMENTS

2009/0237562 A1 9/2009 Fujiwara et al.
2010/0141833 A1 6/2010 Lemmers
(Continued)

FOREIGN PATENT DOCUMENTS

CN 111818294 10/2020
KR 1020080002897 1/2008
(Continued)

OTHER PUBLICATIONS

PCT International Application No. PCT/KR2021/017467, International Search Report dated Aug. 12, 2022, 3 pages.

*Primary Examiner* — Amal S Zenati
(74) *Attorney, Agent, or Firm* — LEE, HONG, DEGERMAN, KANG & WAIMEY

(57) ABSTRACT

A display device according to an embodiment of the present invention may comprise: an audio output unit; a display unit that displays a first image and a second image; and a control unit that, when the first image is focused from among the first image and the second image, outputs a first voice corresponding to the first image through the audio output unit, converts a second voice corresponding to an unfocused second image into text, and displays the converted text on the second image.

13 Claims, 9 Drawing Sheets

(56) References Cited

U.S. PATENT DOCUMENTS

| | | | | |
|---|---|---|---|---|
| 2015/0363091 | A1 | 12/2015 | Lee et al. | |
| 2017/0048490 | A1* | 2/2017 | Martinez | H04N 23/61 |
| 2019/0044985 | A1 | 2/2019 | Jo et al. | |
| 2025/0047326 | A1* | 2/2025 | Frenger | H04B 7/024 |

FOREIGN PATENT DOCUMENTS

| | | |
|---|---|---|
| KR | 1020090100300 | 9/2009 |
| KR | 1020150142462 | 12/2015 |
| KR | 1020160061773 | 6/2016 |
| KR | 1020180113467 | 10/2018 |
| KR | 1020200045205 | 5/2020 |

* cited by examiner

FIG. 9

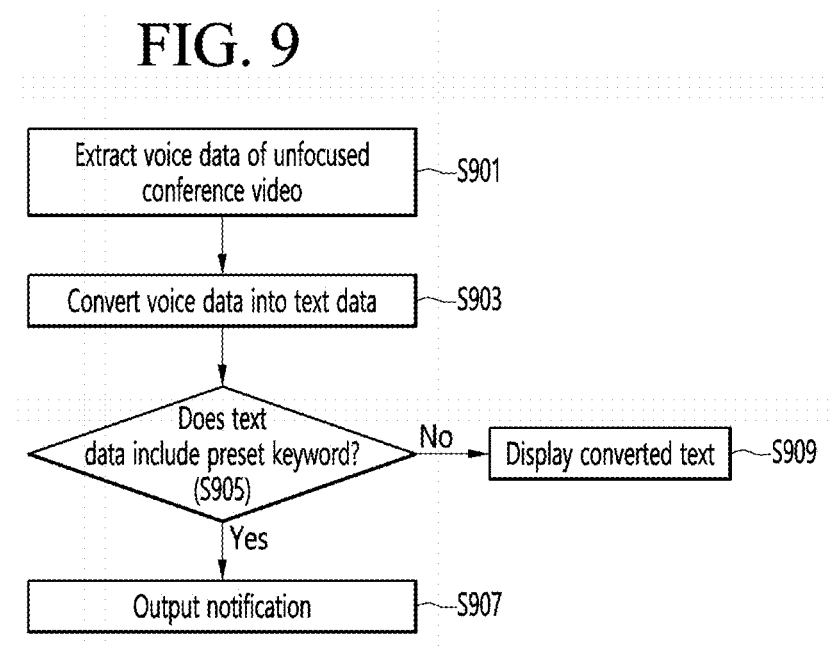

Extract voice data of unfocused conference video — S901

Convert voice data into text data — S903

Does text data include preset keyword? (S905)

No → Display converted text — S909

Yes → Output notification — S907

DISPLAY DEVICE AND METHOD FOR OPERATING SAME

CROSS-REFERENCE TO RELATED APPLICATION(S)

This application is the National Stage filing under 35 U.S.C. 371 of International Application No. PCT/KR2021/017467, filed on Nov. 25, 2021, the contents of which are all incorporated by reference herein in its entirety.

TECHNICAL FIELD

The present disclosure relates to a display device and a method operating the same.

BACKGROUND ART

Digital TV services using wired or wireless communication networks are becoming common. The digital TV services may provide various services that cannot be provided by existing analog broadcasting services.

For example, in the case of IPTV (Internet Protocol Television) and smart TV services, which are types of digital TV services, interactivity is provided so that users can actively select the types of programs to watch, the viewing time, and the like. IPTV and smart TV services may provide various additional services, such as Internet search, home shopping, online games, etc., based on such interactivity.

Recently, as the rate of working from home has increased and the number of customers making video conferences has increased, provision of video conference programs using camera modules on TVs is being considered.

It is easy to set up a video conference on a TV because the TV is an essential piece of home equipment in most households and has a large screen. In particular, conference times often overlap, and unlike a PC, a TV is a large screen and is therefore able to support multiple conferences at the same time.

DISCLOSURE OF INVENTION

Technical Problem

The present disclosure aims to provide convenience when a user participates in two or more video conferences through a display device.

The present disclosure aims to convert the voice of an unselected video conference among a plurality of video conferences into text and provide the text.

The present disclosure aims to effectively use reference videos related to classes not only in video conferences but also in remote classes.

Technical Solution

According to an embodiment of the present disclosure, a display device includes a speaker, a display that displays a first video and a second video, and a controller, that when the first video is focused from among the first video and the second video, outputs a first voice corresponding to the first video through the speaker, converts a second voice corresponding to an unfocused second video into text, and displays the converted text on the second video.

Advantageous Effects

According to various embodiments of the present disclosure, a user may efficiently attend two video conferences even when participating in multiple video conferences.

According to various embodiments of the present disclosure, a user may hear only the voice of a desired conference even when participating in multiple video conferences, thereby preventing a confusing situation in which multiple audio voices may be output.

BRIEF DESCRIPTION OF DRAWINGS

FIG. 9 is a diagram for describing an example in which a preset keyword is included in voice of an unfocused conference video.

BEST MODE FOR CARRYING OUT THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
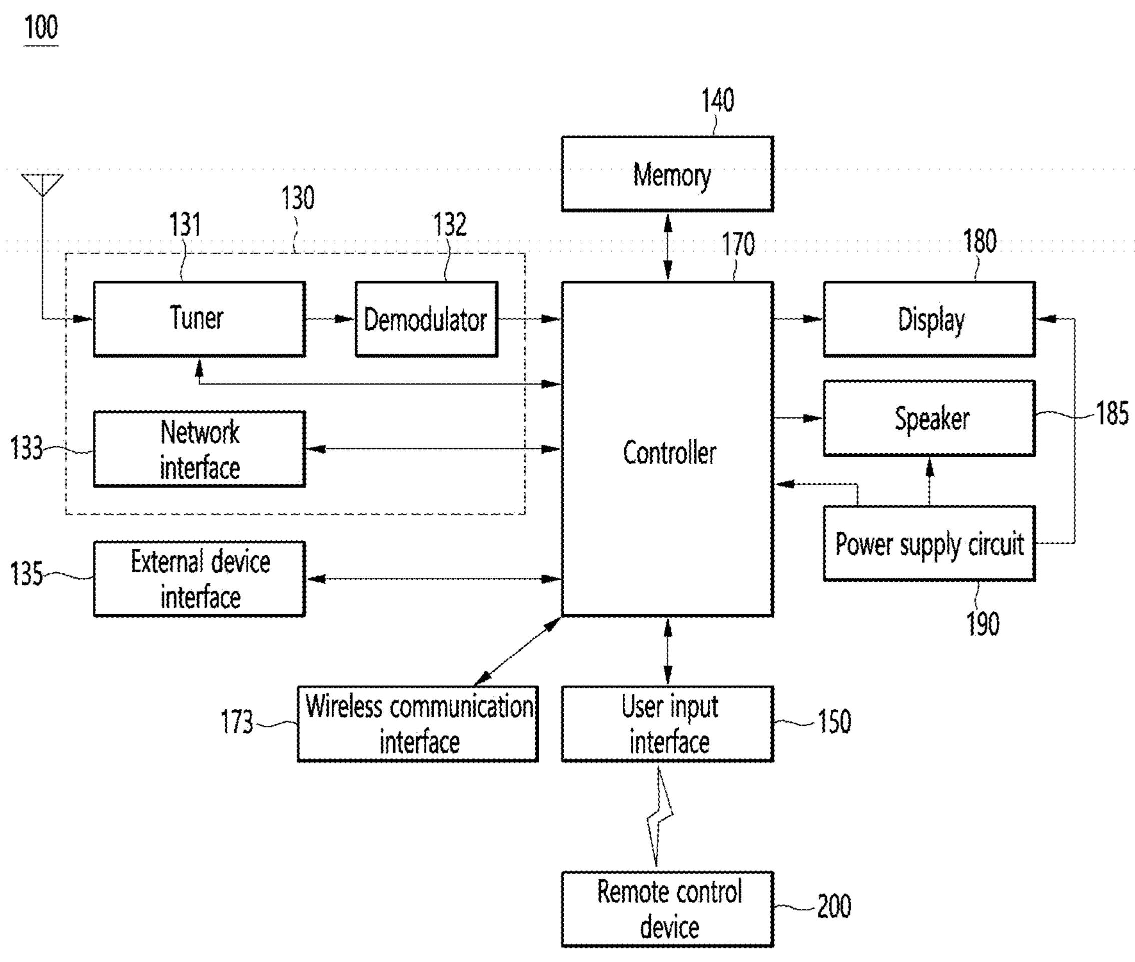
FIG. 1 is a block diagram illustrating a configuration of a display device according to an embodiment of the present invention.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals can include an RGB terminal, at least one High Definition Multimedia Interface (HDMI) terminal, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, the network interface 133 may transmit or receive data to or from a corresponding server by accessing a predetermined webpage through the network.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100. Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
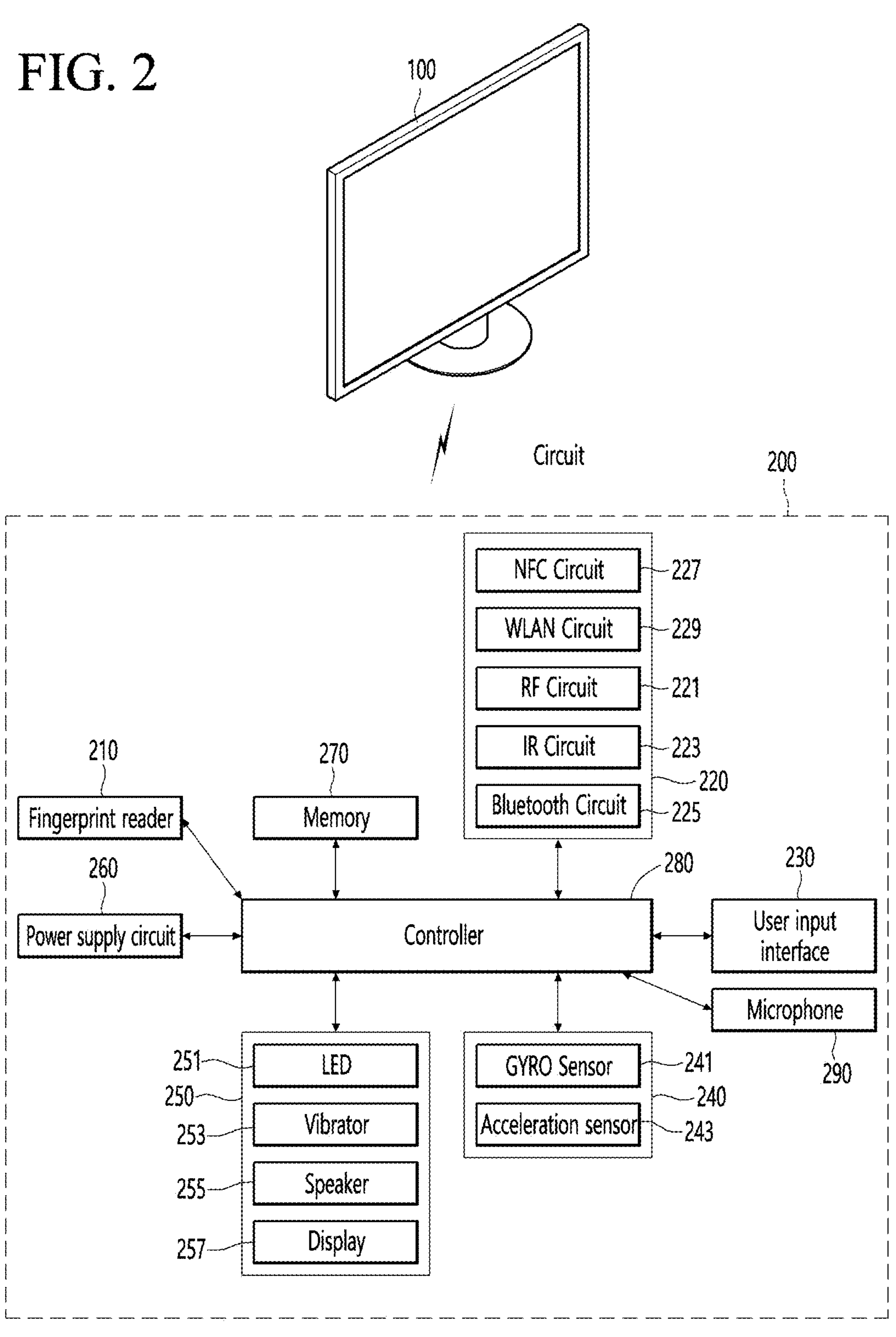
FIG. 2 is a block diagram illustrating a remote control device according to an embodiment of the present invention.
Figure 3:
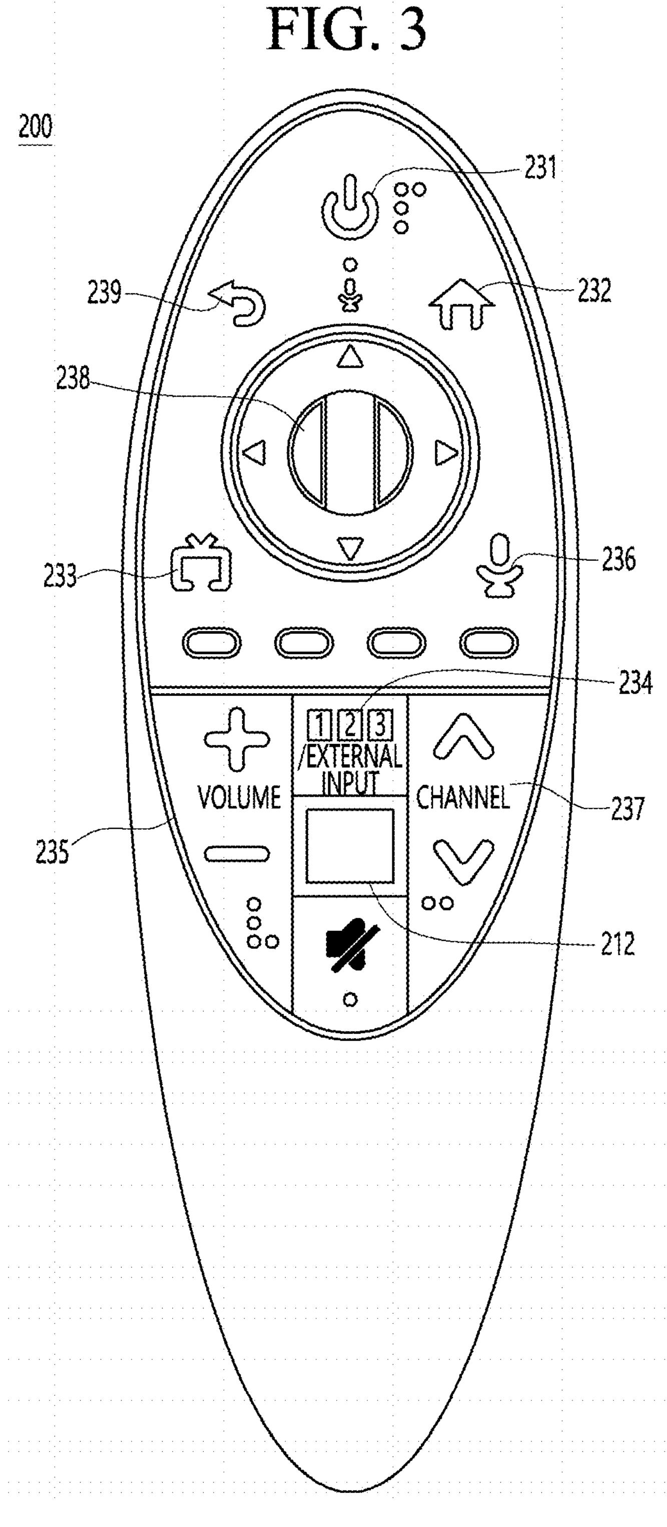
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output a video or audio signal corresponding to the operation of the user input interface 230 or a signal transmitted from the display device 100. The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200. When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication interface 225.

Also, the microphone 290 of the remote control device 200 may obtain a speech.

The microphone 290 may include at least one microphone 291 and obtain speech through the microphone 291.

Next, a description will be given referring to FIG. 4.

Figure 4:
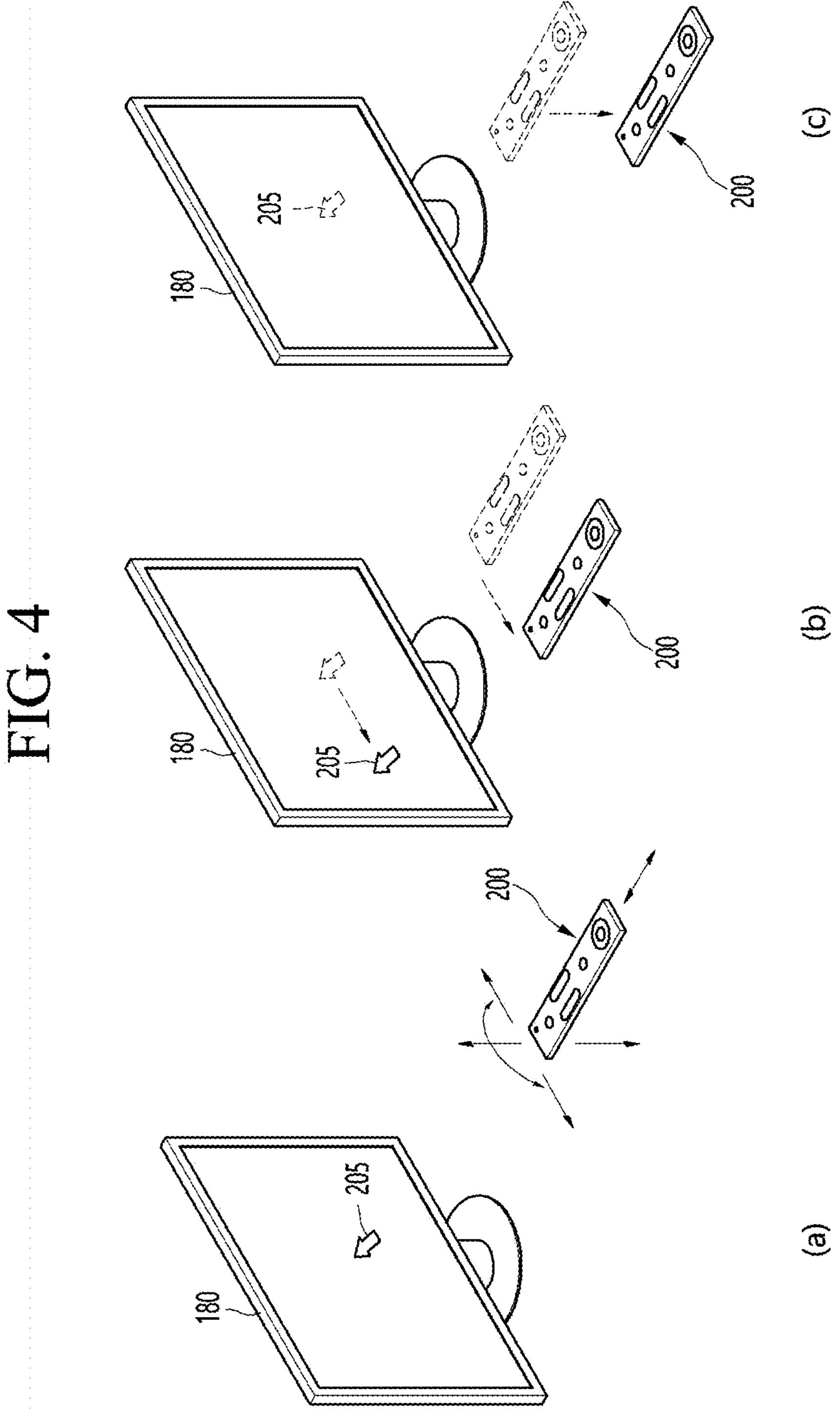
FIG. 4 is a view of utilizing a remote control device according to an embodiment of the present invention.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Moreover, the moving speed or moving direction of the pointer 205 can correspond to the moving speed or moving direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
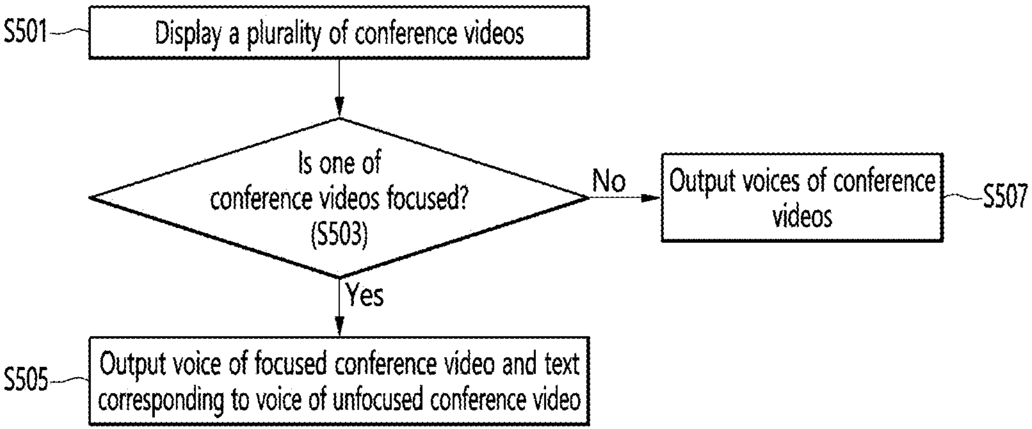
FIG. 5 is a flow chart for describing an operating method of a display device according to an embodiment of the present disclosure.

FIG. 5 is a flow chart for describing a method of operating a display device according to an embodiment of the present disclosure.

Hereinafter, the display device 100 may be a stand-type device that supports a display and is movable.

The controller 170 of the display device 100 may display a plurality of conference videos on the display 180 (S501).

Each of the plurality of conference videos may be a video output according to the execution of the same or different video conference applications.

Each of the plurality of conference videos may be displayed on separate areas.

Figure 6:
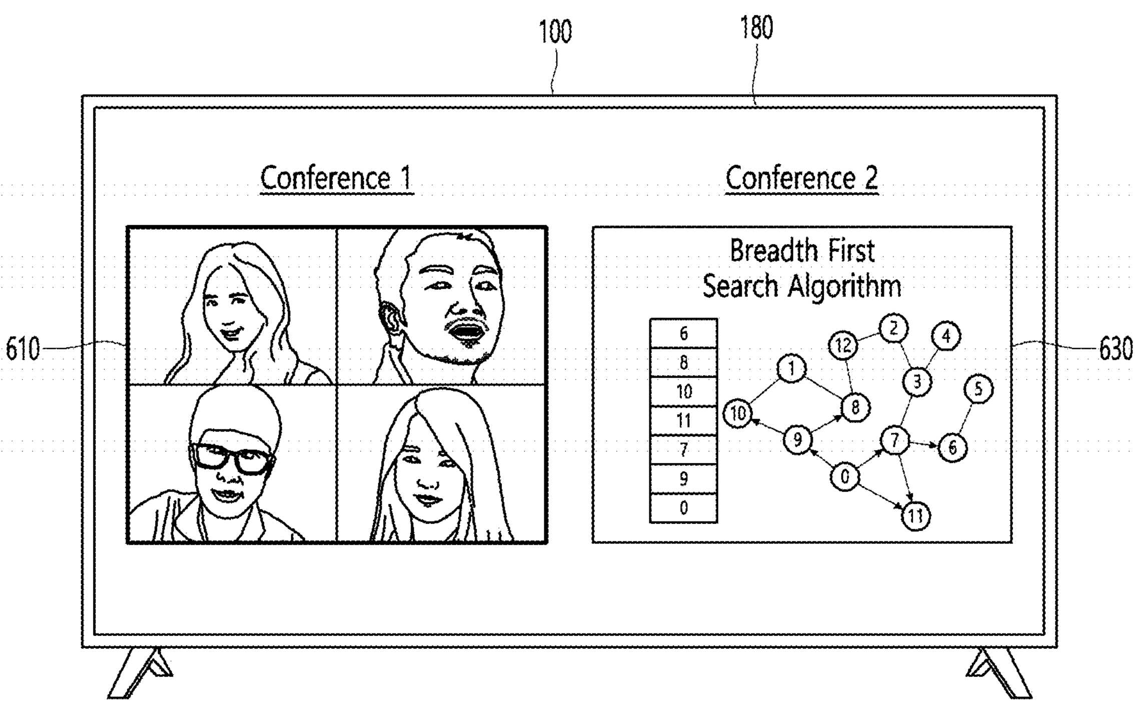
FIG. 6 is a diagram for describing an example in which a plurality of conference videos are displayed according to an embodiment of the present disclosure.

FIG. 6 is a diagram for describing an example in which a plurality of conference videos are displayed according to an embodiment of the present disclosure.

Referring to FIG. 6, the display 180 may display a first conference video 610 on a first area and a second conference video 630 on a second area.

The first conference video 610 may be a video displayed as the first video conference application is executed, and the second conference video 630 may be a video displayed as the second video conference application is executed.

The first video conference application and the second video conference application may be the same or different applications.

In FIG. 6, an example in which only two conference videos are displayed is described, but is not limited thereto, and three or more conference videos may be displayed.

A video based on a video signal received from a counterpart's device may be displayed on each conference video.

The counterpart's device may be any of a TV, smartphone, or camera device.

A description will be given again with reference to FIG. 5.

The controller 170 of the display device 100 may determine which one of the plurality of conference videos is focused (S503).

In one embodiment, the controller 170 may determine which conference video is focused based on a selection command received from the remote control device 200.

For example, when a command to select a first conference video 610 is received from the remote control device 200, the controller 170 may determine that the first conference video 610 is focused.

When a highlight box is located in the first conference video 610, the controller 170 may determine that the first conference video 610 is focused.

As another example, when the controller 170 selects the first conference video 610 through a cursor (not shown) that moves according to the movement of the remote control device 200, the controller 170 may determine that the first conference video 610 is focused.

When one of a plurality of conference videos is focused, the controller 170 of the display device 100 may output the voice of the focused conference video through the speaker 185 and output text corresponding to the voice of an unfocused conference video (S505).

When the plurality of conference videos are displayed and the voice of each conference video is output, the voices may be mixed and the conference may not proceed smoothly.

In an embodiment of the present disclosure, only the voice of the focused conference video may be output through the speaker 185, and the text of the unfocused conference video is displayed through the display 180, allowing the video conference to proceed smoothly.

The controller 170 may display text corresponding to the conference voice of the unfocused conference video superimposed on the unfocused conference video.

Figure 7:
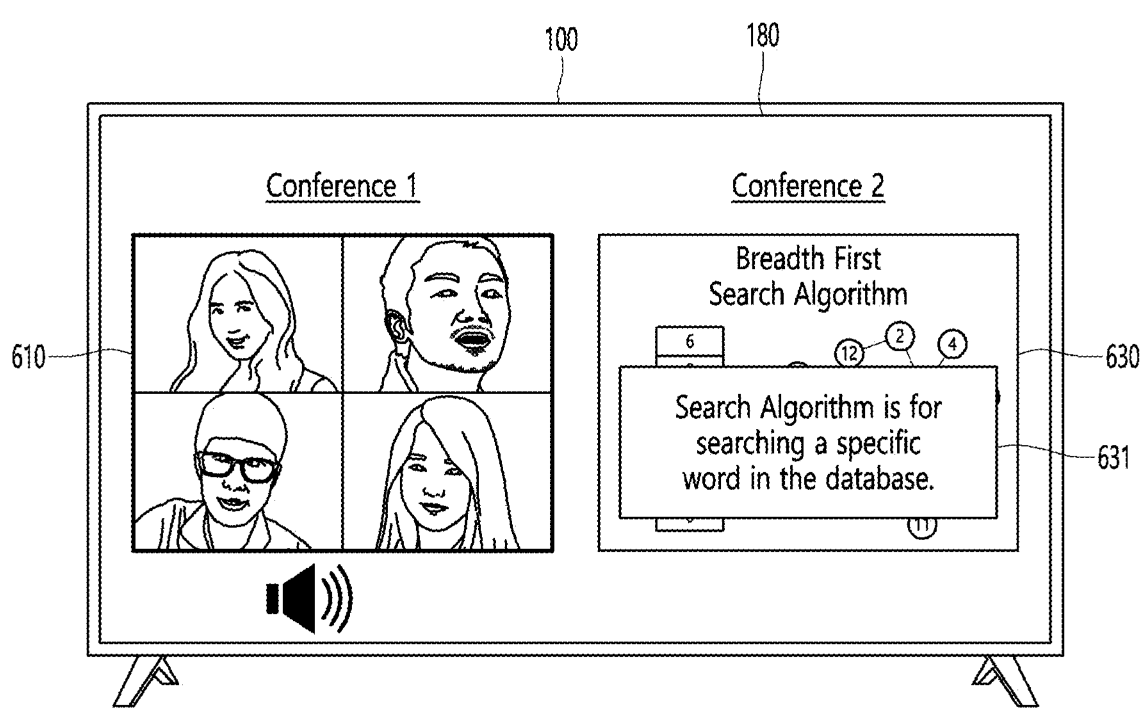
FIG. 7 is a diagram for describing an example of conducting a multi-video conference through an STT engine according to an embodiment of the present disclosure.

FIG. 7 is a diagram for describing an example of conducting a multi-video conference through an STT engine according to an embodiment of the present disclosure.

In FIG. 7, it is assumed that the first conference video 610 is focused (selected).

The controller 170 may output a voice corresponding to the focused first conference video 610 through a speaker (not shown), and display text 631 converted from the voice corresponding to the unfocused second conference video 630 on the second conference video 630.

The controller 170 may process an audio signal received from a first counterpart device transmitting the first conference video 610 and output a voice based on the processed audio signal through a speaker.

In this case, the controller 170 may convert a voice received from a second counterpart device transmitting the second conference video 610 into text through an STT (Speech To Text) engine, and store the converted text 631 in a second area.

As described above, according to an embodiment of the present disclosure, when a user participates in two or more video conferences, he or she is able to selectively use only the video conference for which he or she wants to hear voice.

At the same time, the voice of an unselected video conference is provided as text, thus utilizing the content of the unselected video conference.

When one of the plurality of conference videos is not focused, the controller 170 of the display device 100 may output the voice of the conference video through the speaker 185 (S507).

In another embodiment, the controller 170 may not output any voice when all of the plurality of conference videos are not selected.

In another embodiment, when all of the plurality of conference videos are not selected, the controller 170 may convert the voice of each of the conference videos into text and display the converted text on the corresponding conference video.

Figure 8:
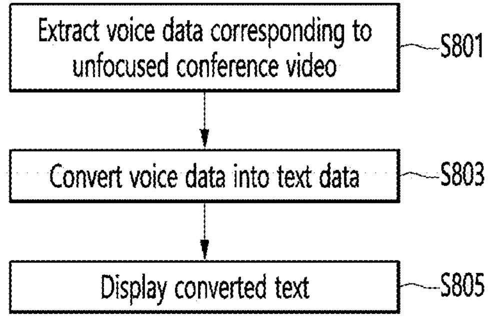
FIG. 8 is a flowchart for describing a process of converting a voice of an unfocused conference video into text and outputting the converted text.

FIG. 8 is a flowchart for describing a process of converting voice of an unfocused conference video into text and outputting the converted text.

FIG. 8 is a diagram specifying the handling of voice of an unfocused conference video in step S505.

Referring to FIG. 8, the controller 170 of the display device 100 may extract voice data corresponding to an unfocused conference video (S801).

The controller 180 may extract voice data received from a counterpart's device transmitting an unfocused conference video.

The controller 170 of the display device 100 converts the extracted voice data into text data using an STT engine (S803).

The controller 170 may convert voice data into text data using a built-in STT engine.

In another embodiment, the controller 170 may transmit voice data to an STT server (not shown) and receive text data converted by the STT server from the STT server.

The controller 170 of the display device 100 may display the converted text data on the display 180 (S805).

The controller 170 may display text data on an area where the unfocused conference video is displayed.

The controller 170 may store text data in the memory 140 in real time.

In another embodiment, the controller 170 may transmit the text data to an electronic device such as a user's smart phone through the wireless communication interface 173.

FIG. 9 is a diagram for describing an example in which a preset keyword is included in voice of an unfocused conference video.

Referring to FIG. 9, the controller 170 of the display device 100 may extract voice data corresponding to an unfocused conference video (S901).

The controller 180 may extract voice data received from a counterpart's device transmitting an unfocused conference video.

The controller 170 of the display device 100 may convert the extracted voice data into text data using an STT engine (S903).

The controller 170 of the display device 100 may determine whether the converted text data includes a preset keyword (S905).

When the converted text data includes a preset keyword, the controller 170 of the display device 100 may output a notification to call the user's attention (S907).

In one embodiment, the preset keyword may be a word set by the user. The user may set a keyword of interest for unfocused video conferences during multi-video conferences.

When the text data includes a preset keyword, the controller 170 may output a notification notifying the appearance of the keyword in various ways.

The controller 170 may blink the corresponding conference video or output a notification notifying the appearance of a keyword through a separate indicator.

Through this, the user may figure out the contents of the unfocused conference video without missing the contents.

When the converted text data does not include a preset keyword, the controller 170 of the display device 100 may display the converted text data (S909).

Figure 10:
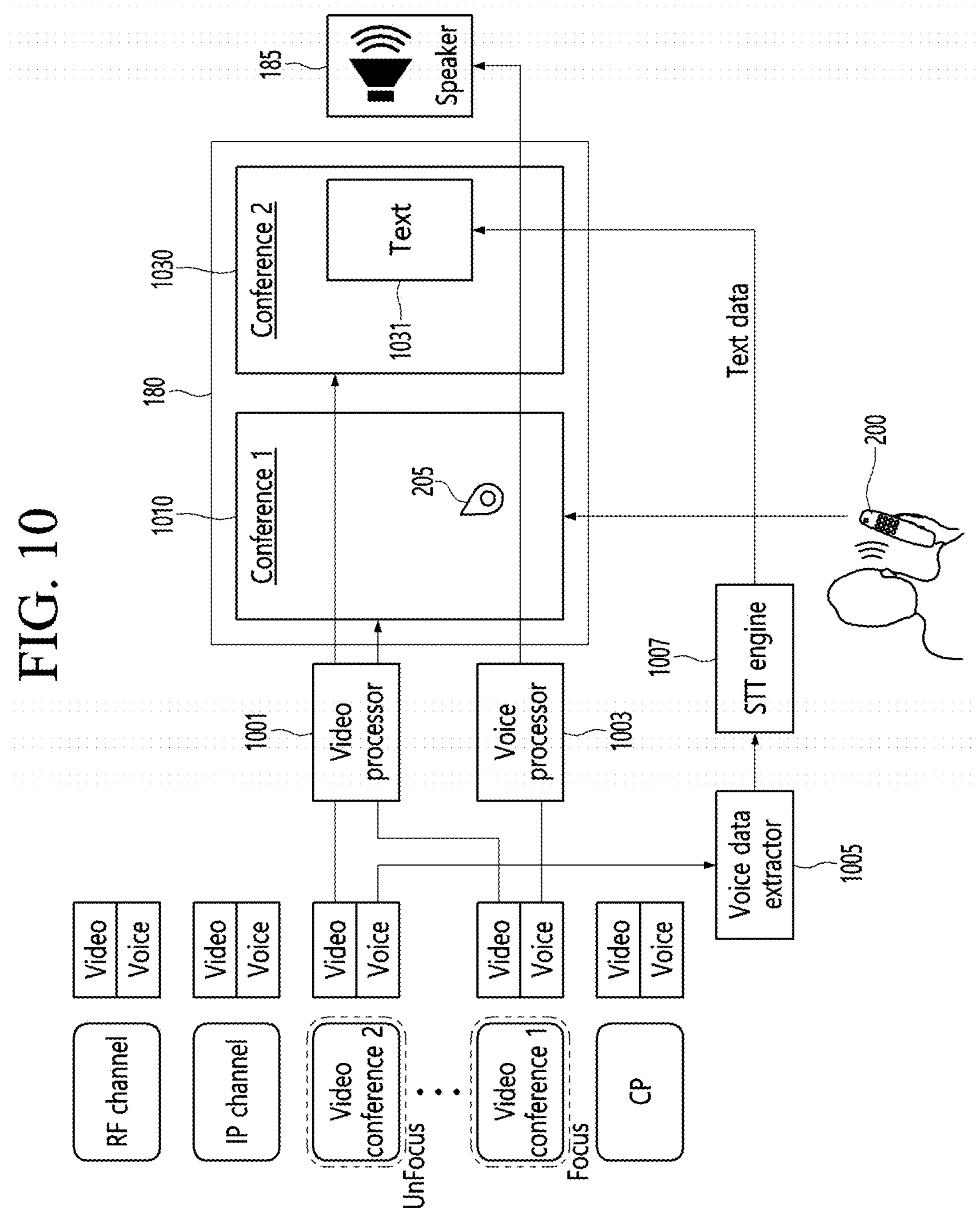
FIG. 10 is a diagram for describing detailed operations when one of two conference videos, which are being displayed, is focused.

FIG. 10 is a diagram for describing detailed operations when one of two conference videos, which are being displayed, is focused.

Referring to FIG. 10, the display device 100 may receive video and voice from various sources.

The tuner 131 of the display device 100 may receive an RF signal through an RF channel or an IP signal through an IP channel.

The IP signal may also be received from a set-top box connected through the external device interface 135.

The display device 100 may receive a first conference video and a first conference voice from a first counterpart device via a first video conference application, and receive a second conference video and a second conference voice from a second counterpart device via the second video conference application.

The display device 100 may receive a conference video and a conference voice through the network interface 133.

The display device 100 may also receive video and voice from a content provider server.

In FIG. 10, it is assumed that a first conference video 1010 and a second conference video 1030 are displayed on the display 180, and the first conference video 1010 is focused.

When the cursor 205 is located on an area where the first conference video 1010 is displayed, the first conference video 1010 may be focused.

The controller 170 may include a video processor 1001, a voice processor 1003, a voice data extractor 1005, and an STT engine 1007.

The video processor 1001 may process an acquired video signal and output the video signal to the display 180. The video processor 1001 may scale the video signal and output the scaled video signal to the display 180.

The video processor 1001 may output a first video conference video 1010 received through a first video conference application and a second video conference video 1030 received through a second video conference application on separate areas.

The voice processor 1003 may preprocess an acquired voice signal and output the preprocessed voice signal through the speaker 185.

The voice processor 1003 may output a first conference voice received through the first video conference application via the speaker 185.

A second conference voice received through the second video conference application is not output via the speaker 185.

The voice data extractor 1005 may extract voice data from the second conference voice corresponding to the second conference video which is not focused.

The STT engine 1007 may convert the extracted voice data into text data and output the converted text data to the display 180. The display 180 may display text 1031 based on the text data on the second conference video 1030.

The display device 100 may receive a spoken voice uttered by a user through the remote control device 200 from the remote control device 200.

The display device 100 may transmit the spoken voice to the first counterpart device corresponding to the first conference video 1010, which is focused, via the network interface 133.

As described above, a user may input a voice into a video conference on which he or she wants to focus during multi-video conferences, or receive a voice from the video conference.

Figure 11:
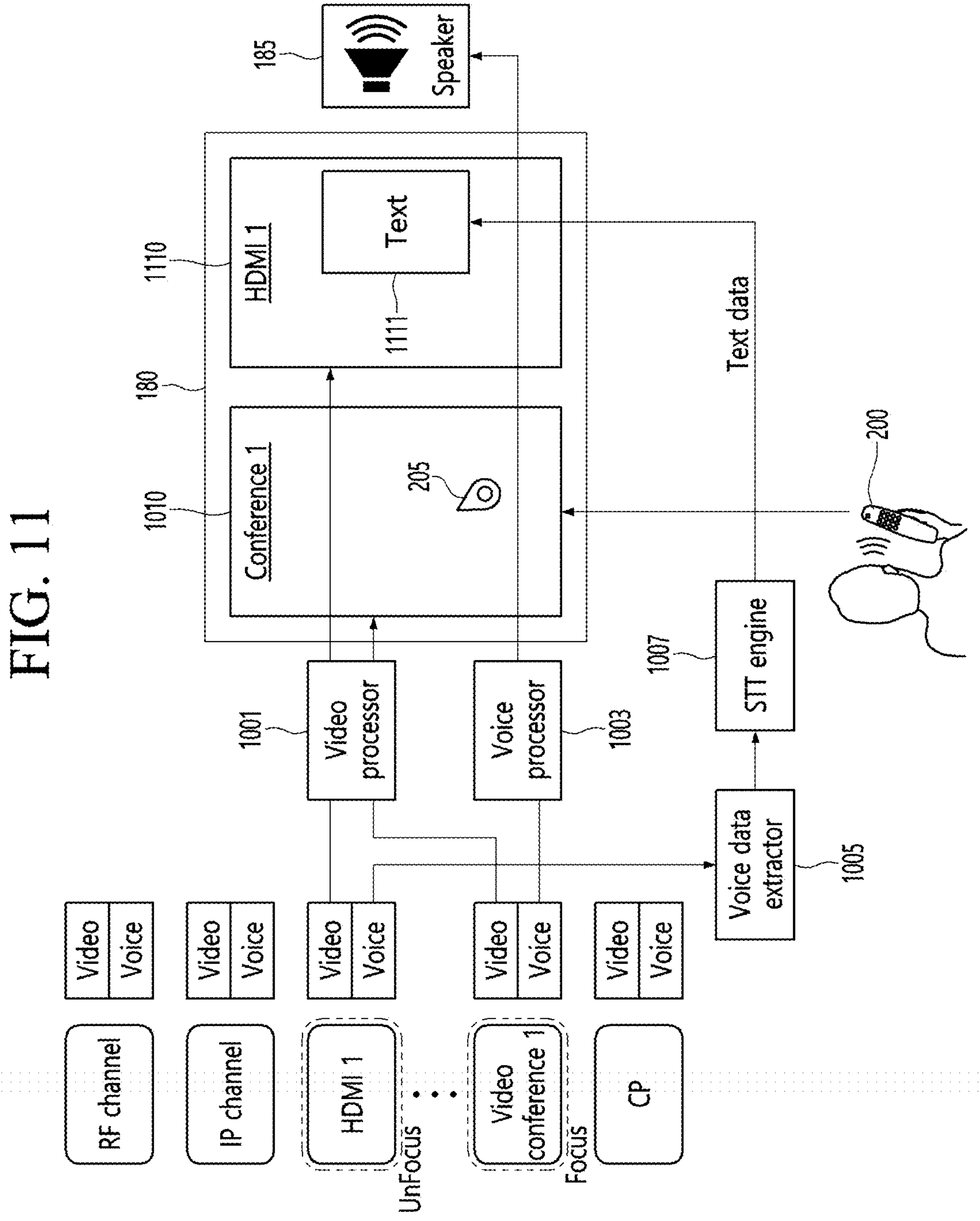
FIG. 11 is a diagram for describing detailed operations when a conference video is focused while one conference video and an HDMI video output through a terminal HDMI 1 are being displayed.

FIG. 11 is a diagram for describing detailed operations when a conference video is focused while one conference video and an HDMI video output through a terminal HDMI 1 are being displayed.

In FIG. 11, the first conference video 1010 received through the network interface 133 and the HDMI video 1110 received through the terminal HDMI 1 of the external device interface 135 are displayed on the display 180.

An external device is connected to the terminal HDMI 1, and the HDMI video 1110 may be displayed based on the video signal output by the external device.

Additionally, in FIG. 11, the first conference video 1010 is focused through a cursor 205.

Like FIG. 10, the controller 170 may include a video processor 1001, a voice processor 1003, a voice data extractor 1005, and an STT engine 1007.

The video processor 1001 may output the first conference video 1010 and the HDMI video 1110 on separate areas.

The voice processor 1003 may output a first conference voice corresponding to the first conference video 1010 via the speaker 185.

The HDMI voice received from an external device connected to the terminal HDMI 1 is not output via the speaker 185.

The voice data extractor 1005 may extract voice data from the HDMI voice corresponding to the HDMI video 1110 which is not focused.

The STT engine 1007 may convert the extracted voice data into text data and output the converted text data to the display 180. The display 180 may display text 1111 based on text data on the HDMI video 1110.

The display device 100 may receive a spoken voice uttered by a user through the remote control device 200 from the remote control device 200.

The display device 100 may transmit the spoken voice to a first counterpart device corresponding to the first conference video 1010, which is focused, through the network interface 133.

In this way, the user is able to input a voice into a video conference or receive a voice of the video conference even when the conference video and an external input video are being displayed at the same time.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device comprising:

a speaker;

a display configured to display a first video at a first area of the display and to display a second video at a second area of the display; and a controller configured to:

based on the first video being focused from among the first video and the second video:

output a first voice corresponding to the first video through the speaker, without outputting, through the speaker, a second voice corresponding to the second video which is not focused;

extract voice data corresponding to the second voice of the second video;

convert the voice data corresponding to the second voice into text; and display the text to be superimposed on the second video displayed at the second area.

2. The display device of claim 1, wherein the controller is further configured to determine that the first video is focused based on receiving a command to select the first video from a remote control device.

3. The display device of claim 1, wherein the controller is further configured to output a notification indicating that a keyword is included when the text includes a preset keyword.

4. The display device of claim 1, further comprising:

a network interface configured to communicate with a first counterpart device and a second counterpart device.

5. The display device of claim 4, wherein the first video which is focused is a first conference video received from the first counterpart device, and the second video which is not focused is a second conference video received from the second counterpart device.

6. The display device of claim 5, wherein the controller is further configured to receive a spoken voice uttered by a user from a remote control device and transmit the received spoken voice to the first counterpart device.

7. The display device of claim 1, further comprising:

a network interface configured to communicate with a first external device; and an external device interface connected to a second external device, wherein the first video which is focused is a conference video received from the first external device via the network interface, and the second video which is not focused is an external input video received from the second external device via the external device interface.

8. A method for operating a display device, the method comprising:

displaying a first video at a first area of a display of the display device;

displaying a second video at a second area of the display; and based on the first video being focused from among the first video and the second video:

outputting a first voice corresponding to the first video through a speaker of the display device, without outputting, through the speaker, a second voice corresponding to the second video which is not focused;

extracting voice data corresponding to the second voice of the second video:

converting the voice data corresponding to the second voice into text; and displaying the text to be superimposed on the second video displayed at the second area.

9. The method of claim 8, further comprising:

determining that the first video is focused based on receiving a command to select the first video from a remote control device.

10. The method of claim 8, further comprising:

outputting a notification indicating that a keyword is included when the text includes a preset keyword.

11. The method of claim 8, wherein the first video which is focused is a first conference video received from a first counterpart device, and the second video which is not focused is a second conference video received from a second counterpart device.

12. The method of claim 11, further comprising:

receiving a spoken voice uttered by a user from a remote control device; and transmitting the received spoken voice to the first counterpart device.

13. The method of claim 8, wherein the display device includes a network interface configured to communicate with a first external device, and an external device interface connected to a second external device, and wherein the first video which is focused is a conference video received from the first external device via the network interface, and the unfocused second video is an external input video received from the second external device via the external device interface.

* * * * *